Figure 12:
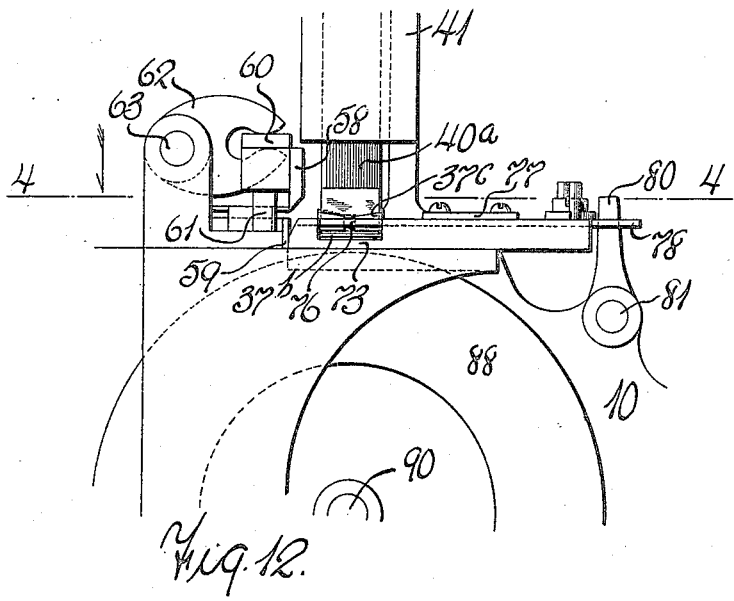

W. H. PARKER.
BOX MACHINE.
APPLICATION FILED SEPT. 18, 1907.
902,679.
Patented Nov. 3, 1908.
5 SHEETS—SHEET 1.
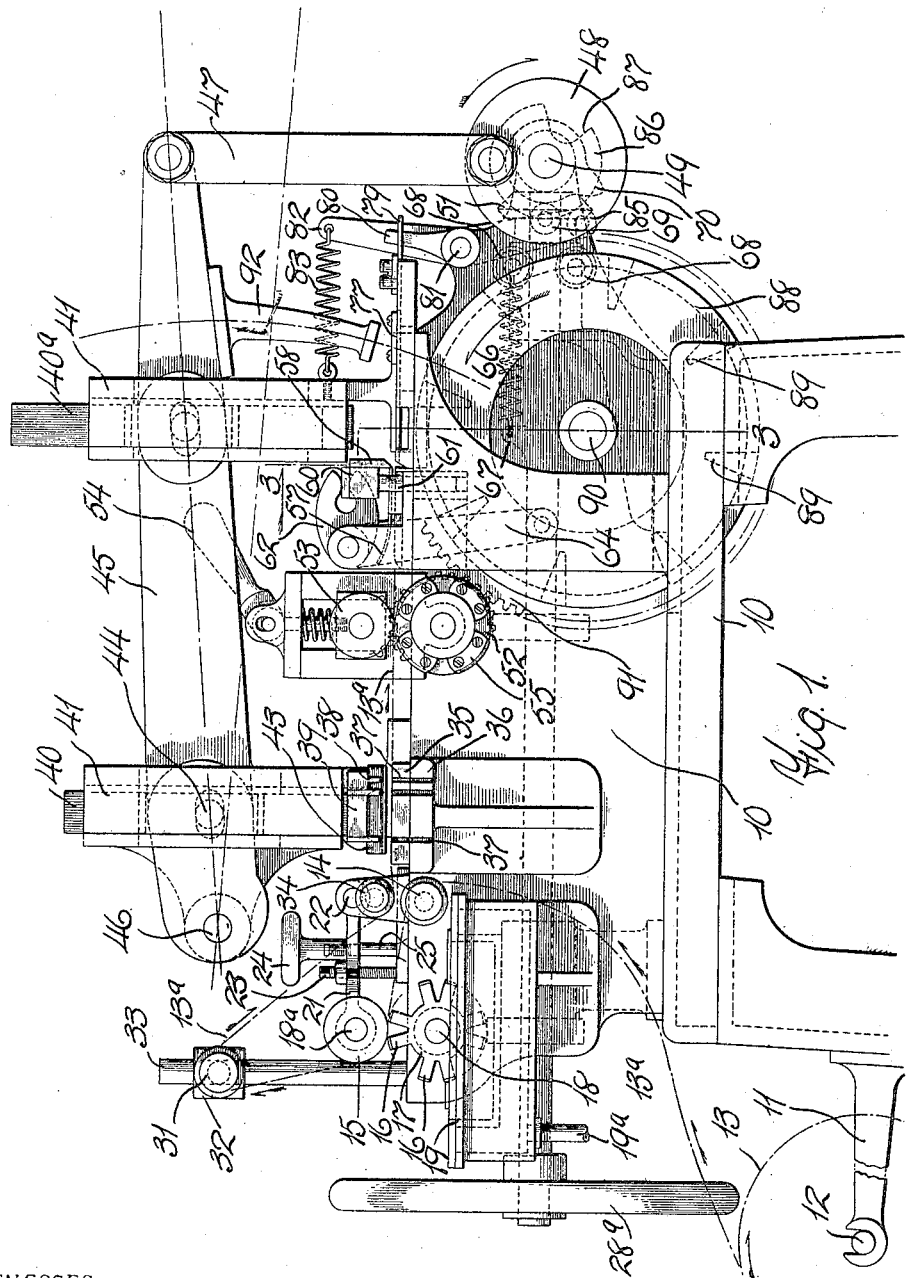
WITNESSES:
Ralph Lancaster
Frank L. Stubbs
INVENTOR.
William H. Parker.
BY
W. B. Hutchinson.
ATTORNEY.

W. H. PARKER.
BOX MACHINE.
APPLICATION FILED SEPT. 18, 1907.
902,679.
Patented Nov. 3, 1908.
5 SHEETS—SHEET 2.
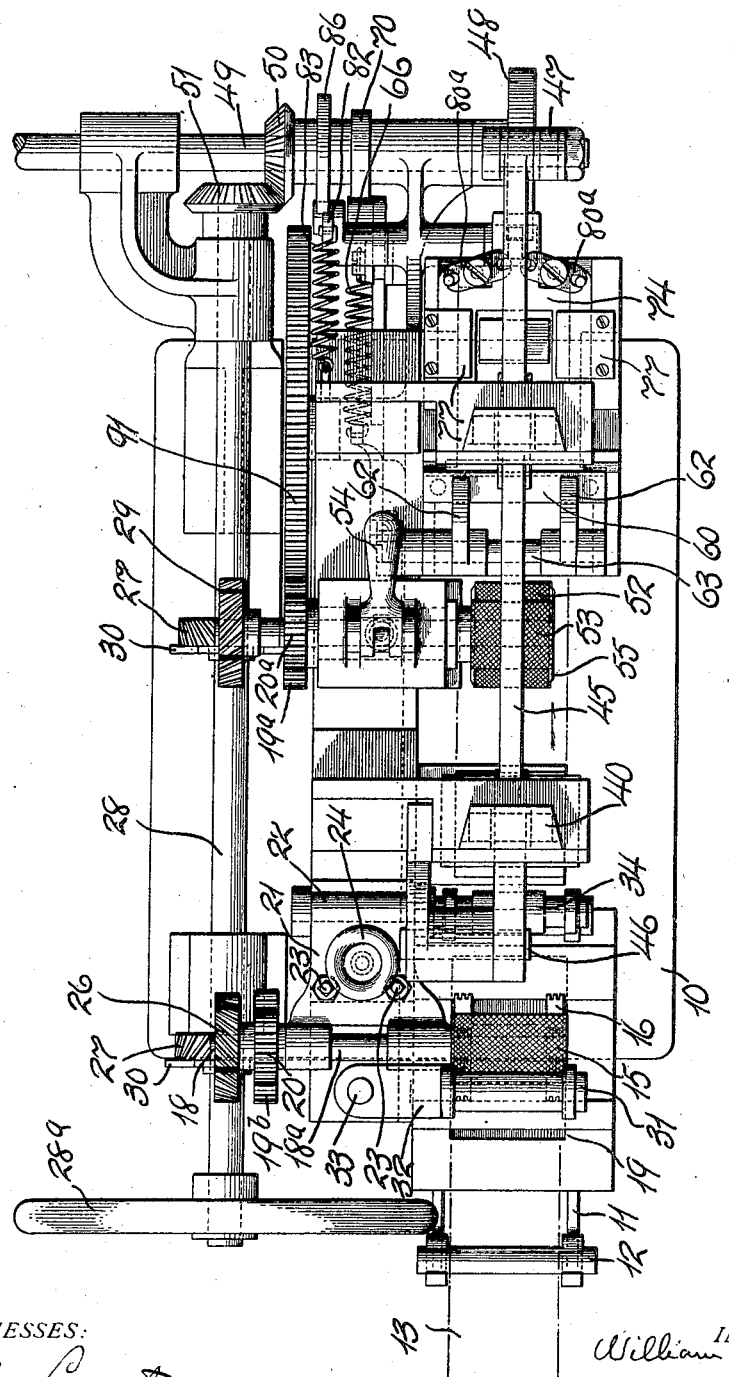
WITNESSES:
Ralph Lancaster
Frank L. Stubbs
INVENTOR.
William H. Parker,
BY
W. B. Hutchinson,
ATTORNEY W. H. PARKER.
BOX MACHINE.
APPLICATION FILED SEPT. 18, 1907.
902,679.
Patented Nov. 3, 1908.
5 SHEETS—SHEET 3.
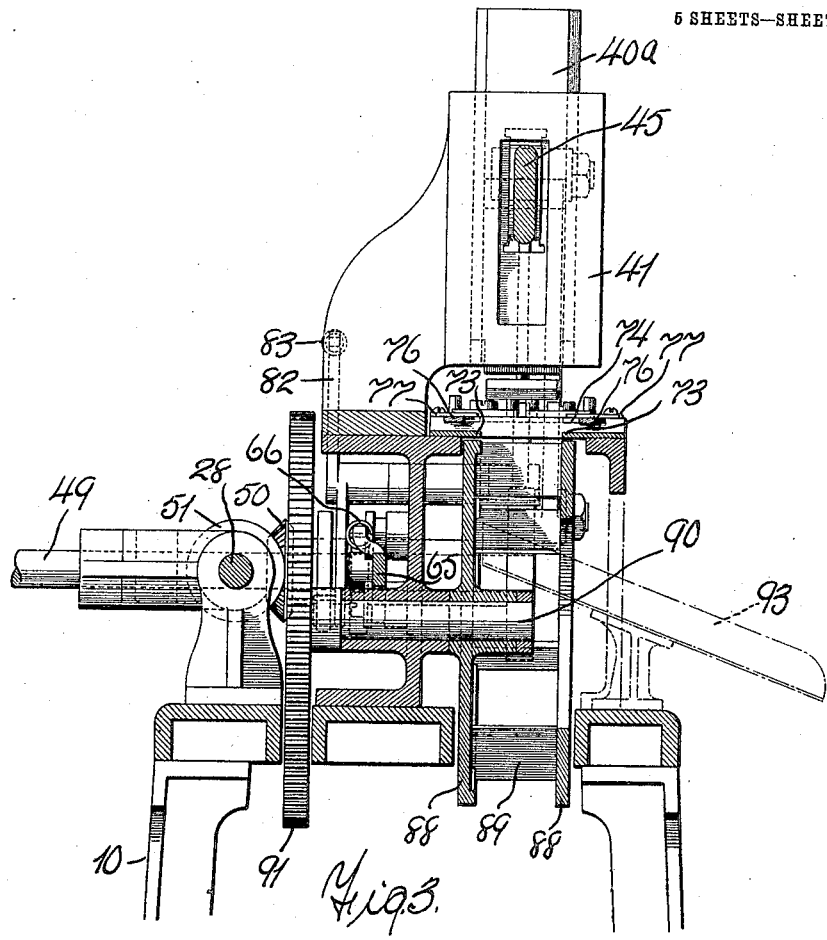
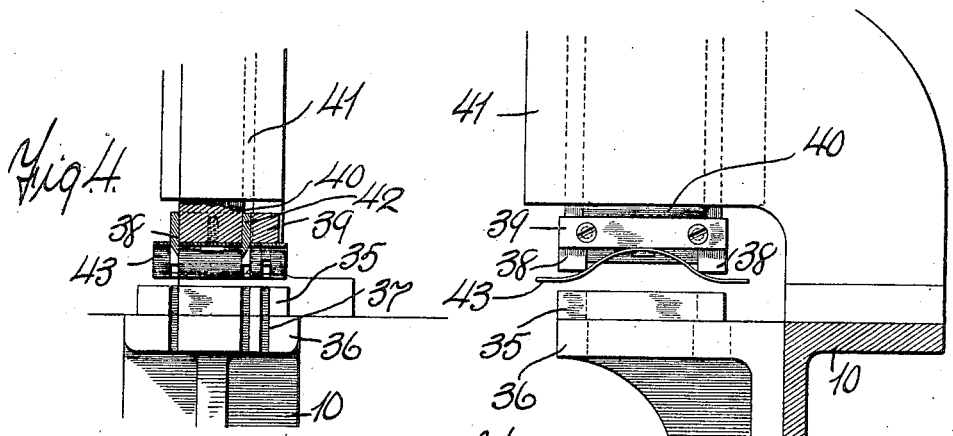
WITNESSES:
INVENTOR.
William H. Parker.
BY
ATTORNEY.

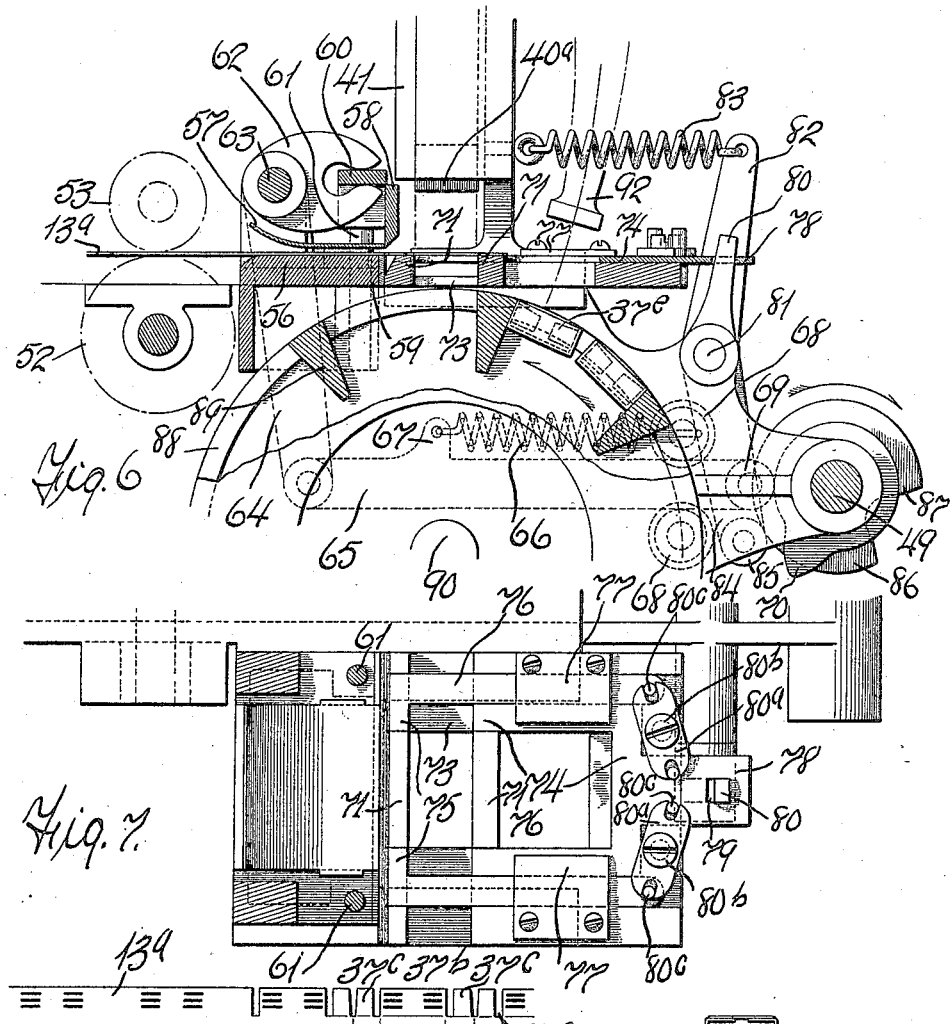

UNITED STATES PATENT OFFICE.

WILLIAM H. PARKER, OF PASSAIC, NEW JERSEY.

BOX-MACHINE.

No. 902,679.  Specification of Letters Patent.  Patented Nov. 3, 1908.

Application filed September 18, 1907. Serial No. 393,576.

*To all whom it may concern:*

Be it known that I, WILLIAM H. PARKER, of the city of Passaic, county of Passaic, and State of New Jersey, have invented a new and useful Improvement in Box-Machines, of which the following is a full, clear, and exact description.

My invention relates to improvements in machines for making boxes, and more particularly to machines which are adapted to make so-called trays, that is, open topped tray-like boxes which are used in connection with an outside shuck or wrapper. These trays are generally used for match boxes or hardware boxes, although of course they can be used for many other purposes.

The object of my invention is to produce a machine which will work very much more rapidly than the ordinary machine for box tray making, and which will also produce a perfect box or tray. In carrying out this idea I employ a main lever, which at one operation operates a scoring punch, a cut-off knife to cut the box blanks from a long strip of paper, and an ejector which removes the formed boxes from the rotary carrier into which they have been placed as made. In this way I get a very rapid working machine, and moreover, I am enabled to use a carrier which holds the boxes in place until the glue has set.

With these ends in view and with the general object of making an efficient and rapid working box machine, my invention consists of certain features of construction and combinations of parts which will be hereinafter described and the novel features claimed.

Reference is to be had to the accompanying drawings forming a part of this specification, in which similar reference characters indicate corresponding parts in all the views.

Figure 13:
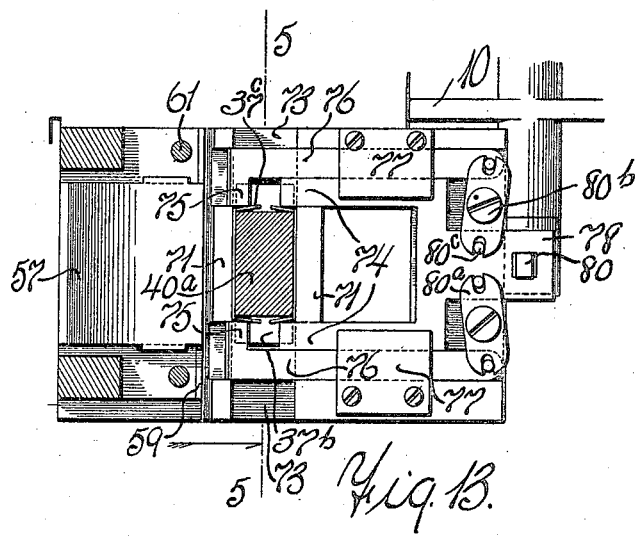
Figure 14:
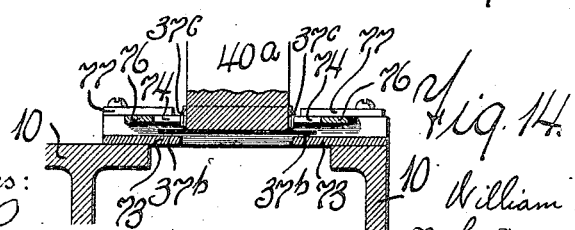

Figure 1 is a broken side elevation of the machine embodying my invention. Fig. 2 is a plan view of the machine. Fig. 3 is a cross section on the line 3. 3 of Fig. 1. Fig. 4 is a detail sectional view of the scoring mechanism which cuts notches edgewise into the stock to form the box flaps. Fig. 5 is a broken elevation at right angles to Fig. 4. Fig. 6 is an enlarged detail section of the shaping dies and the receiving carrier. Fig. 7 is a broken detail plan of the folding mechanism. Fig. 8 is a detail of the stock after it has been scored. Fig. 9 is a plan view of the formed tray or box. Fig. 10 is a detail of the gear mechanism for working a part of the machine, showing the manner in which the gear locks so as to absolutely stop the mechanism. Fig. 11 is a view taken at right angles to Fig. 10. Fig. 12 is a broken enlarged detail side elevation of a part of the machine, Fig. 13 is a sectional plan on the line 4—4 of Fig. 12, and Fig. 14 is a cross section on the line 5—5 of Fig. 13.

The machine has a suitable frame 10 for supporting the operating parts, and it is intended to operate on a roll of stock, having to this end brackets 11 at one end of the machine, which carry the shaft 12, on which the roll of stock 13, shown by dotted lines in Fig. 2, is carried. The course of the stock is at first over the gluing mechanism, and this is substantially as usual, and nothing is claimed for it. The course of the stock $13^a$ can best be seen in Fig. 1, where it leaves the roll 13, passes over a guide roller 14, and thence back between a second guide roller 15, and above the arms 16 of the wheel 17, which turns on the shaft 18 and in the glue pot 19, the latter being connected with a steam pipe $19^a$ for heating it, and the turning of the wheel causes the arm 16 to carry up sufficient glue to stick the necessary points on the stock. The roller 15 is adjustable so that the necessary pressure can be brought against the arms 16, and to this end its shaft $18^a$ is hung in a bracket 21, which is pivoted at 22, and is fastened down by a hand nut 24 fitting on a screw rod 25, and also by nuts and bolts 23 as shown clearly in Figs. 1 and 2. The shafts 18 and $18^a$ are geared together by the gears $19^b$ and 20, and the lower shaft has a spiral pinion 26 (see Figs. 2, 10, and 11) which meshes with a mutilated spiral pinion 27 on the shaft 28 which runs along one side of the machine, is mounted in suitable bearings, and has a balance wheel $28^a$ to make it steady. The wheel 26 is at necessary intervals slotted in its face, as shown at 29, and these slots engage the flange 30 of the mutilated pinion 27, while the pinion 26 is opposite the smooth part of the pinion 27, and so the pinions are not only thrown out of gear, but are absolutely locked, so that the inertia of the machine parts cannot carry the feed forward during this interval. This same arrangement for locking the stock feed is also used in connection with the feed at another point to be hereinafter referred to, and the locking occurs while a box is being formed, so that the feed is stopped and there is no chance for any false movements.

After leaving the roller 15, the stock travels upward and forward over a roller 31, which is secured to a bracket 32, and the latter can be adjusted on a supporting post 33. The stock then goes downward and forward (see Fig. 1) beneath the guide roller 34, which guides the stock to the first die plate or supporting plate 35, which is supported on a bed plate 36, and the die plate and bed plate have grooves 37 to receive the punches 38 which are secured to the head 39, and when the punches descend, they cut the slots 37$^a$ (see Fig. 8) in the stock 13$^a$, thus forming the tongues 37$^c$ which, when the stock is cut off at 37$^d$ as hereinafter described, can be folded in against the inner sides of the end tongues or flaps 37$^b$, and the complete tray 37$^e$ formed.

The punches are carried by the plunger 40 which moves in a vertical way 41, and which also carries a score knife 42 (see Fig. 4) to make the corner score 37$^f$ for the box bottom. The plunger 40 carries at its lower end a slotted plate spring 43, which is secured in the middle of the plunger, and the ends of which extend below the punches 38, and the object of the spring is to prevent the stock from sticking to the plunger or punches as the latter rise. The plunger can be operated in any convenient way, but I prefer to operate the plunger together with other parts hereinafter described, from a single main lever 45, with which the plunger has a slot and pin connection, as shown at 44 in Fig. 1. The lever 45 extends substantially the length of the machine above the working parts, and is pivoted at one end as shown at 46, to suitable brackets, while its free end connects by a link 47 with a disk 48 on the driving shaft 49, which is arranged transversely at one end of the machine, and can be driven in any suitable way. The driving shaft also connects by gears 50 and 51 with the shaft 28 already referred to, as shown in Fig. 2.

After the stock is scored as just described, it is carried forward between the lower and upper feed rollers 52 and 53, the upper roller 53 being hung in adjustable bearings and operated by a lever 54. This detail is not fully described, as it is not new, and any adjustable bearing can be used. The lower roller carries the score knives 55 which make the corner score 37$^g$ (see Fig. 8) in the stock. The shafts of the rollers 52 and 53 are connected by pinions 19$^b$ and 20$^a$, and connect with the shaft 28 by the same gearing already described, and which connects the shaft 18$^a$ and 18 with the said shaft 28.

After leaving the rollers 52 and 53 the stock goes over a table 56 and beneath a guide 57, where it is cut off by the cutter 58 which shears across a stationary cutter 59 (see Fig. 6). The cutter or knife 58 is carried by a head 60 which has guide pins 61 working through holes in the bed plate, and the head 60 is operated by the cranks 62 which grip it in a manner to permit of a certain amount of sliding motion as shown at Fig. 6, and the cranks 62 are secured to a shaft 63 which turns in suitable bearings, and has an arm 64 extending downward and connected with a slide rod 65 which is normally pulled forward by the spring 66, connecting with the boss 67 on the rod 65, and with a part of the machine frame. The slide rod 65 moves between rollers 68. The rod 65 carries a roller 69 at its free end which engages the cam 70 on the driving shaft 49. The action of the cam is to push the rod 65 back, tilt the rock shaft 63, and move down the head 60 and knife 58 so as to cut off the stock 13$^a$, just before a box blank is delivered to the forming dies and beneath the plunger 40$^a$. The plunger 40$^a$ is operated like the plunger 40 already described, and it is of the right size to fit the bottom of the tray 37$^e$, and is adapted to extend downward into and through the die plate 71, which has end plates 72 and 73, one above the other, so that when a box blank is pushed down through the die plate, the plate 72 will push the end flaps 37$^b$ partly but not fully in, and the end fold will be completed by pushing the blank downward between the plates 73.

The flaps 37$^c$ are turned inward so as to fit against the inner or glued parts of the flaps 37$^b$ by the folders 74 and 75. The folders 75 have arms 76, referred to presently, and the folder 74 is of rectangular loop shape. These must, obviously move in opposite directions so as to act on the flaps 37$^c$ and turn them in. To this end they are in the same plane, and the folder 75 is longer than the folder 74, and has arms 76 moving beneath the guide plate 77, which also serve to guide the folder 74. The folder 74 has a tongue 78 which is slotted as shown at 79 (see Fig. 7) to receive the stud or crank 80 which is mounted on the rock shaft 81, the latter having a crank arm 82 which is pulled in one direction by the spring 83 (see Fig. 6) which throws the second arm 84 of the rock shaft forward so as to bring the roller 85 on the said arm against the face of the cam 86, and the latter has a recess 87 into which the roller sinks when the rock shaft 81 is to be operated and the folders 74 and 75 set in action. The folders 74 and 75 are connected by the short levers 80$^a$, which are fulcrumed as shown at 80$^b$ and have slotted ends connecting with pins 80$^c$, located respectively on the arms 76 and on the folder 74, so that when the roller 85 drops into the depression or recess 87, the crank 80 will throw back the folder 74, which through the medium of the levers 80$^a$ will throw forward the folder 75, and the flaps 37$^c$ will be thrown inward inside the flaps 37$^b$, at which time the plunger 40$^a$ pushes the whole tray downward through the die plate 73, thus completing the fold.

When the above action takes place, the formed trays are pushed down into a rotary carrier 88, which has transverse ribs 89 forming pockets in the carrier, and the width of the carrier is such that the ends of the trays 37$^e$ are held snugly between the opposite sides of the carrier, and the carrier is of such a size that the glued ends have a chance to set before the trays are ejected, as presently described. The carrier 88 is secured to a shaft 90 (see Fig. 3) and this connects by a gear 91 with a pinion 19$^a$ (see Fig. 2).

When the lever 45 is depressed, as already described it scores the stock, forms the box, as just stated, and it also moves down a plunger or ejector 92 which is arranged so as to follow the plunger 40$^a$, and this ejecting plunger 92 moves downward through suitable openings in the folders 74 and 76 and in the machine frame and engage a tray 37$^e$, which tray will be the first tray made as the carrier turns from right to left looking at Fig. 6. This moves the first tray into the interior of the rotary carrier, and a chute 93 can, if desired, be arranged to receive it.

It will be observed that the scoring, forming, and ejecting mechanisms are all moved by a single lever, that these mechanisms all move co-instantaneously, and that the movements occur when the rest of the mechanism is locked by reason of the gears shown in Figs. 10 and 11. It will be seen, therefore, that I get a very rapid working machine, because of the fact that all the above operations take place at one stroke while the feed is stopped, and it will be seen, further, that the arrangement shown and described makes a very positive and comparatively simple mechanism.

Obviously many of the details of construction can be departed from without affecting the principle of the invention, the essential features of which lie, as stated, in the simultaneous means for scoring, forming, and ejecting the boxes, and for locking the feed during such operations.

Having thus fully described my invention, I claim as new and desire to secure by Letters Patent:—

1. A box machine, comprising a stock feed, a scoring mechanism, a box forming device, a carrier to receive the formed boxes, an ejector to remove the boxes from the carrier, a main oscillating lever extending longitudinally of the machine and having the ejector rigid thereon, and an operative connection between the said main lever and the before mentioned scoring, box forming, carrying and ejecting mechanisms.

2. A box machine comprising a stock feed, a scoring plunger, a cut-off knife, a box forming plunger, a rotary wheel carrier arranged to receive the boxes formed by the last mentioned plunger, a main oscillating lever directly operating the scoring and box forming mechanism, and an ejector carried by the main lever and arranged to extend through the spaces in the wheel carrier.

3. A box machine comprising a stock feed, a scoring plunger, a die, a box forming plunger moving through the die, a rotary wheel carrier having spaces to receive the boxes pushed through the die, an oscillating lever having an operative connection with the aforesaid plungers, and an ejector rigid on the lever and arranged to extend into the spaces of the wheel carrier.

4. In a box machine, the combination of the die, the rotary wheel carrier turning below the die and having box receiving spaces thereon, the plunger moving through the die, and the oscillating lever carrying the plunger and provided with an ejector rigid thereon, said ejector moving into the spaces of the wheel carrier.

5. A box machine comprising a stock feed, a scoring plunger, a box forming plunger, a rotary wheel carrier below the box forming plunger, an oscillating main lever having a slot and pin connection with both the aforesaid plungers, and an ejector rigid on the lever and shaped to enter the spaces of the wheel carrier.

WILLIAM H. PARKER.

Witnesses:
  A. J. WILLIFORD,
  THOS. P. MOORE.